United States Patent
Oroskar et al.

(10) Patent No.: US 10,051,603 B1
(45) Date of Patent: Aug. 14, 2018

(54) METHODS AND SYSTEMS FOR ADJUSTING PAGE TRANSMISSION POWER

(71) Applicant: Sprint Spectrum L.P., Overland Park, KS (US)

(72) Inventors: Siddharth S. Oroskar, Overland Park, KS (US); Jasinder P. Singh, Olathe, KS (US); Ryan Dreiling, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/629,648

(22) Filed: Jun. 21, 2017

(51) Int. Cl.
*H04W 68/02* (2009.01)
*H04W 76/34* (2018.01)
*H04W 52/44* (2009.01)
*H04W 76/06* (2009.01)

(52) U.S. Cl.
CPC ........... *H04W 68/02* (2013.01); *H04W 52/44* (2013.01); *H04W 76/064* (2013.01); *H04W 76/34* (2018.02)

(58) Field of Classification Search
CPC .... H04W 68/02; H04W 76/064; H04W 52/44
USPC ................ 455/458, 522; 340/7.63
See application file for complete search history.

(56) References Cited

U.S. PATENT DOCUMENTS

| | | | |
|---|---|---|---|
| 5,111,197 | A | 5/1992 | Ichikawa |
| 5,369,681 | A | 11/1994 | Boudreau et al. |
| 5,673,259 | A | 9/1997 | Quick, Jr. |
| 5,884,170 | A | 3/1999 | Valentine et al. |
| 5,889,783 | A | 3/1999 | Maloney et al. |
| 6,088,589 | A | 7/2000 | Valentine et al. |
| 6,138,034 | A | 10/2000 | Willey |
| 6,181,945 | B1 | 1/2001 | Lee |
| 6,188,885 | B1 | 2/2001 | Kolev et al. |
| 6,687,339 | B2 | 2/2004 | Martin |
| 6,711,413 | B1 | 3/2004 | Heidari |
| 6,745,039 | B1 | 6/2004 | Di Lalla |
| 6,856,789 | B2 | 2/2005 | Pattabiraman et al. |
| 6,963,750 | B1 | 11/2005 | Cheng et al. |

(Continued)

OTHER PUBLICATIONS

Cai et al., "Mitigating DoS Attacks on the Paging Channel by Efficient Encoding in Page Messages," Computer Science Department, International Conference on Security and Privacy in Communication Systems. Springer, Berlin, Heidelberg, 2009, 20 pages.

(Continued)

*Primary Examiner* — Inder Mehra (57) ABSTRACT

Methods and systems disclosed herein can help to dynamically adjust page transmission power, and in particular, the transmission power for quick paging bits, depending upon whether a user equipment (UE) is operating as a single radio LTE (SRLTE) device. An exemplary method involves an access network making a determination that a UE is configured to use a single radio system for (a) data communication under a first air interface protocol, and (b) voice calls under a second air interface protocol; and responsively initiating a process to set a transmission power used to page the first UE for a voice call under the second air interface protocol to a higher power level, as compared to a transmission power level utilized to page a second UE configured to use separate radio systems for data communication under the first air interface protocol and voice calls under the second air interface protocol.

20 Claims, 6 Drawing Sheets

(56) References Cited

U.S. PATENT DOCUMENTS

| | | |
|---|---|---|
| 7,366,526 B2 | 4/2008 | Zhang et al. |
| 7,583,984 B2 | 9/2009 | Sun et al. |
| 7,983,696 B1 | 7/2011 | Manghat et al. |
| 8,000,684 B1 | 8/2011 | Bhan et al. |
| 8,203,963 B1 | 6/2012 | Oroskar et al. |
| 8,306,558 B1 | 11/2012 | Oroskar et al. |
| 8,355,740 B1 | 1/2013 | Oroskar et al. |
| 8,670,788 B1 | 3/2014 | Oroskar et al. |
| 8,682,358 B1 | 3/2014 | Shah et al. |
| 2005/0164741 A1 | 7/2005 | Rajkotia et al. |
| 2006/0018347 A1 | 1/2006 | Agrawal |
| 2006/0251033 A1 | 11/2006 | Oprescu-Surcobe et al. |
| 2007/0057767 A1 | 3/2007 | Sun et al. |
| 2007/0060175 A1 | 3/2007 | Park et al. |
| 2007/0202849 A1 | 8/2007 | Moeller |
| 2007/0233323 A1 | 10/2007 | Wiemeyer et al. |
| 2008/0032713 A1 | 2/2008 | Yang |
| 2008/0096520 A1 | 4/2008 | Benco et al. |
| 2008/0188247 A1 | 8/2008 | Worrall |
| 2008/0293437 A1 | 11/2008 | Ranganathan et al. |
| 2008/0317144 A1 | 12/2008 | Huang et al. |
| 2009/0106798 A1 | 4/2009 | Nabatani et al. |
| 2009/0181701 A1 | 7/2009 | Willey et al. |
| 2010/0128621 A1 | 5/2010 | Hamabe et al. |
| 2013/0021925 A1 | 1/2013 | Yin et al. |
| 2013/0260758 A1* | 10/2013 | Zhao ............... H04W 36/14 455/436 |
| 2013/0288731 A1 | 10/2013 | Chu |
| 2014/0080479 A1* | 3/2014 | Vangala ............ H04W 76/028 455/424 |
| 2015/0270877 A1 | 9/2015 | Hessler et al. |
| 2015/0282237 A1* | 10/2015 | Su ................... H04W 76/025 455/552.1 |
| 2015/0341149 A1 | 11/2015 | Chatterjee et al. |

OTHER PUBLICATIONS

Poole, Ian. "4G LTE CoMP, Coordinated Multipoint Tutorial," 2015, 6 pages (http://www.radio-electronics.com/info/cellulartelecomms/).

* cited by examiner

METHODS AND SYSTEMS FOR ADJUSTING PAGE TRANSMISSION POWER

BACKGROUND

In wireless communication systems, wireless service providers may operate radio access networks (RANs), each RAN including a number of base stations radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

Further, a RAN may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others. Each protocol may define its own procedures for registration of UEs, initiation of communications, handover between base station coverage areas, and other functions.

In accordance with the air interface protocol, each base station may provide wireless service to UEs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a UE on a single such carrier at a time or, with carrier aggregation service or the like, on multiple such carriers at a time.

Further, each base station in such a RAN may be communicatively linked with a signaling controller that carries out various network control functions, such as managing setup of bearer connections between the base station and one or more transport networks, tracking where UEs are located in the RAN, paging UEs, and the like. In addition, neighboring base stations may be communicatively linked with each other, to facilitate handover and other inter-base station signaling.

By way of example, in an LTE RAN, each base station (LTE evolved Node-B (eNodeB)) has a communication interface with a signaling controller known as a mobility management entity (MME), the base station and MME each also have a respective communication interface with a gateway system that provides connectivity with a packet-switched transport network, and the base station has a communication interface with each of its neighboring base stations. Typically, the nodes of such an LTE RAN would sit on a wireless service provider's core packet-switched network (e.g., a network compliant with the industry standard system architecture evolution (SAE) for the LTE protocol), and so the base station and each other RAN entity (e.g., MME, gateway, and neighboring base station) may each have an assigned Internet Protocol (IP) address on that network, and the interfaces between these entities may be defined as logical connections (e.g., established virtual tunnels) through that network.

In example operation, when a UE enters into coverage of an LTE base station on a particular carrier, the UE signals to the base station to initiate an attach process and to establish a radio-link-layer connection with the base station. In this process, the base station signals to the MME, the MME authenticates the UE, the MME and base station obtain and store a context/profile record for the UE, and the gateway system assigns an IP address to the UE for use by the UE to communicate on the packet-switched transport network. Further, at this point or later, the MME may engage in signaling with the base station and the gateway system to establish for the UE one or more bearers for carrying packet data between the UE and the transport network.

Once a UE is so attached with a base station, the base station then serves the UE on one or more carriers, managing downlink communication of packet data to the UE and uplink communication of packet data from the UE. For example, as the gateway system receives packet data destined to the UE, the gateway system may forward the packet data to the base station, and the base station may schedule and provide transmission of that data to the UE on the UE's serving carrier(s). Likewise, as the UE has packet data to transmit on the transport network, the UE may transmit a scheduling request to the base station, the base station may schedule transmission of that data from the UE on the UE's serving carrier(s), the UE may accordingly transmit the data to the base station, and the base station may then forward the data to the gateway system for output on the transport network.

In order to utilize legacy cellular networks, a service provider may implement a hybrid wireless communication system that includes multiple separate but interconnected RANs. For example, a service provider may implement a first RAN that provides high speed data communications, and a second RAN that provides traditional telephony service, with each RAN providing air interface coverage according to a different air interface protocol. In such an arrangement, a UE may acquire connectivity with and be served by the first RAN and may at some point transition to instead connect with and be served by the second RAN. For instance, some existing hybrid systems include an LTE RAN (e.g., the LTE RAN discussed above) for data communications and a circuit-switched RAN, such as a CDMA RAN (or GSM RAN or the like), for legacy telephone service.

A UE that operates in a hybrid system may be configured as a single radio device, which utilizes the same radio system for communications on both networks in the hybrid system. In the context of a hybrid system utilizing LTE for data communications, a UE with the capability of using one radio system for both LTE communication and communication under at least one other protocol (e.g., CDMA) may be referred to as a single-radio LTE (SRLTE) device or an SRLTE UE. Similarly, when using a single radio system to engage in communication under LTE and at least one other protocol may be referred to as operating in an SRLTE mode.

When operating in a hybrid system, an SRLTE UE can register with both the LTE network and the CDMA network. However, when LTE service is available, an SRLTE UE will remain connected to the LTE network, except for cases when communication via the CDMA network is needed, such as tuning away to listen for pages or initiate a voice call via the CDMA network. As such, an SRLTE UE periodically disconnects from the LTE network and tunes to the CDMA network (e.g., at scheduled paging occasions) to check for any page messages directed to the UE from the CDMA network. If the SRLTE UE does not receive a page from the CDMA network, then UE, it will re-connect to the LTE network.

OVERVIEW

As noted above, an SRLTE UE may periodically tune its radio system away from LTE in order to check for page messages from the CDMA network (or a network using a different protocol Since the process of checking for CDMA page messages involves an SRLTE device disconnecting from the LTE network, an SRLTE device may have lower LTE throughput (e.g., as compared to a device that uses separate radio systems for LTE and CDMA communications). Accordingly, it is desirable to reduce the amount of time an SRLTE spends disconnected from an LTE network in order to listen for page messages from the CDMA network.

When an SRLTE UE utilizes CDMA2000 1xRTT or 1x Advanced for voice calls, a Quick Paging Channel (QPCH) is provided, which can help to reduce the amount of time required for an SRLTE UE to discern whether or not it has an incoming CDMA page, so the UE can re-connect to LTE more quickly in the event there is no CDMA page for the UE. Under a CDMA2000 protocol, the QPCH notifies a UE of a page or updated overhead messages on the paging channel about 100 ms prior to the assigned slot on the paging channel. When an SRLTE UE uses the QPCH, it only needs to disconnect from LTE long enough to demodulate one or two QPCH bits that indicate whether a page is present in the following slot cycle, and can then re-connect if the QPCH bit(s) indicate that no page is scheduled for the UE. (Comparatively, in a previous CDMA IS-95 systems, a UE would listen for a page for an entire slot cycle during its assigned slot.)

However, in the event that an SRTLE UE tunes away to listen to the QPCH and cannot successfully decode one or both QPCH bits, the UE remain connected to the CDMA network to listen to its assigned slot in the next paging slot cycle. In the case where no page is scheduled for the SRLTE UE, the failure to decode a QPCH bit can unnecessarily increase the time spent disconnected from the LTE network, and in turn reduce the UE's LTE throughput. Thus, it is desirable to increase the probability that an SRLTE can successfully decode QPCH bits.

Exemplary embodiments may help to improve LTE throughput for SRLTE devices, In particular, exemplary methods and systems can help to dynamically increase the transmission power on the QPCH for single-radio devices (as compared to a device using multiple radio systems, that is otherwise similarly situated).

In some embodiments, the transmission power may be increased for all QPCH bits transmitted to an SRLTE device. However, higher transmission power on the QPCH can potentially result in undesirable interference. Thus, to balance interference concerns with the desire to reduce tune-away time and improve LTE throughput for an SRLTE device, some embodiments may selectively increase the transmission power to an SRLTE device on the QPCH, such that some, but not all, QPCH transmissions are a higher transmission power. For instance, in the case where a CDMA network is configured to make up to a predetermined number of attempts to successfully send a given page to a UE, the QPCH transmission power may be increased for the first attempt to transmit the page, but set to a lower power level for any subsequent attempts to transmit the same page to the UE. Other examples are also possible.

In one aspect, an exemplary method involves a network entity in a radio access network: (i) making a determination that a first UE is configured to use a single radio system for both (a) data communication under a first air interface protocol, and (b) voice calls under a second air interface protocol that is different from the first air interface protocol; and (ii) in response to making the determination, initiating a process to set a transmission power used to page the first UE for a voice call under the second air interface protocol to a higher power level, as compared to a transmission power level utilized to page a second UE configured to use separate radio systems for data communication under the first air interface protocol and voice calls under the second air interface protocol.

In another aspect, an exemplary system may be implemented in or take the form of one or more components of a radio access network, and includes a communication interface operable for voice communications under a first air interface protocol, a non-transitory computer readable medium, and program instructions stored on the non-transitory computer readable medium. The program instructions are executable by the at least one processor to: (i) make a determination that a first UE is configured to use a single radio system for both (a) data communication under a first air interface protocol, and (b) voice calls under a second air interface protocol that is different from the first air interface protocol; and (ii) in response to making the determination, initiate a process to set a transmission power used to page the first UE for a voice call under the second air interface protocol to a higher power level, as compared to a transmission power level utilized to page a second UE configured to use separate radio systems for data communication under the first air interface protocol and voice calls under the second air interface protocol.

In a further aspect, another exemplary method involves a network entity in a radio access network: (i) receiving a page message for transmission to a first UE, wherein the radio access network is configured to make up to a predetermined number of attempts to successfully page the first UE for a voice call under the second air interface protocol; (ii) making a determination as to whether or not a first UE is configured to as a single radio system for both data communication under a first air interface protocol, and voice calls under a second air interface protocol that is different from the first air interface protocol; (iii) determining an attempt count corresponding to the page message; and (iv) based on (a) the determination as to whether or not the first UE is configured as a single radio system and (b) the attempt count, determining a paging transmission power corresponding to the page message to first UE.

These as well as other aspects, advantages, and alternatives, will become apparent to those of ordinary skill in the art by reading the following detailed description, with reference where appropriate to the accompanying drawing.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

The present disclosure focuses by way of example on an arrangement including LTE and CDMA access networks and SRLTE devices operating in such a hybrid system. It will be understood, however, that the specifics shown and described are intended only as examples, and that numerous variations are possible. For instance, the principles discussed can be applied in an arrangement involving other types of access networks, other types of media systems, and/or other types of devices. Further, even within the examples disclosed, various elements (e.g. components and/or operations) can be rearranged, distributed, integrated, reordered, omitted, added, and otherwise modified.

I. Exemplary Network Infrastructure

Figure 1A:
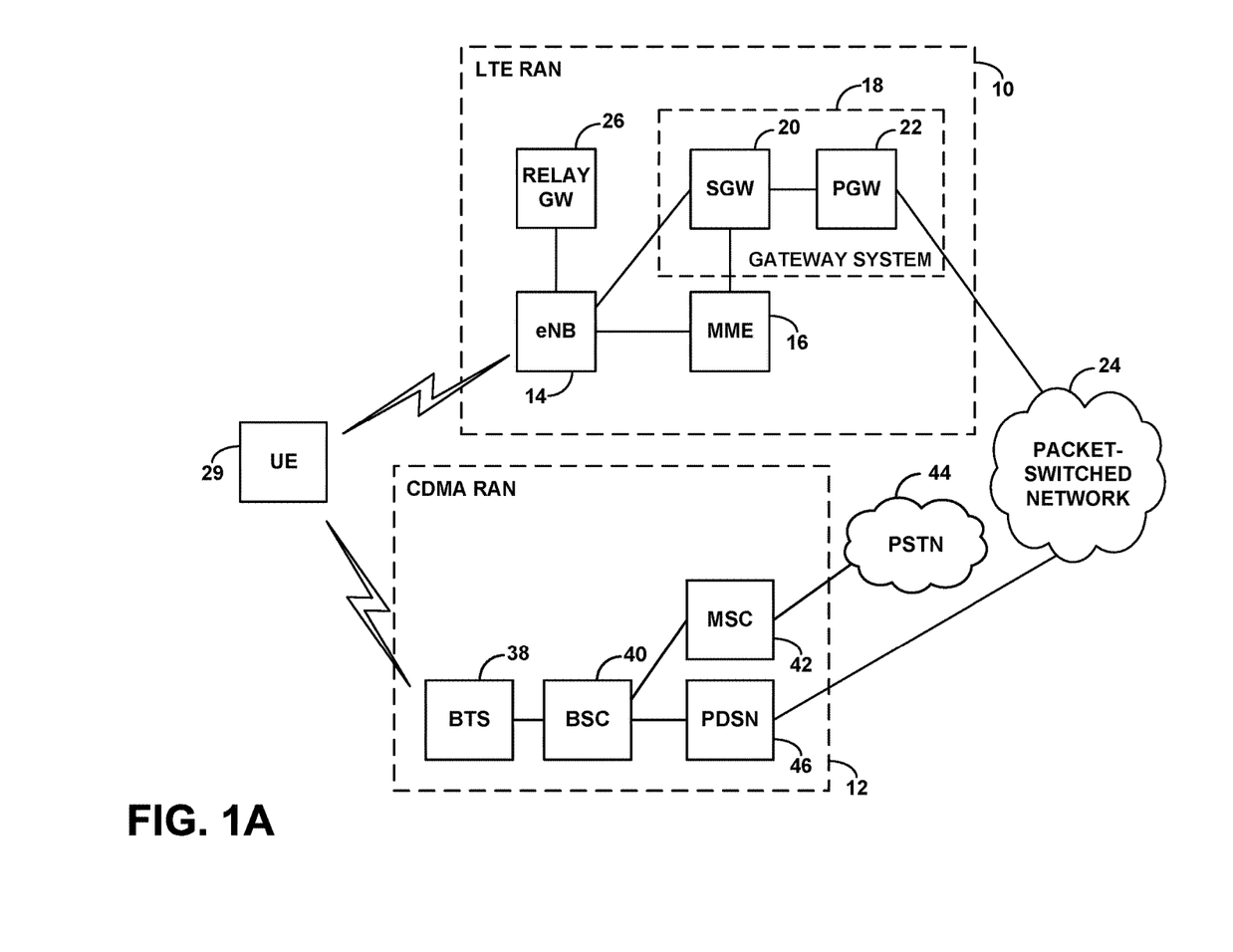
FIG. 1A is a simplified block diagram of an example wireless communication system, according to exemplary embodiments.

FIG. 1 is a simplified block diagram of an example wireless communication system in which the present method and system can be implemented. In particular, the example system includes an LTE RAN 10 and a CDMA RAN 12. In the example system, the LTE RAN functions primarily to serve UEs with wireless packet data communication service. Whereas the CDMA RAN primarily serves UEs with wireless circuit-switched voice call service but may also provide packet-data communication service and other types of service. The LTE RAN may be a packet-switched network, compliant with the industry standard SAE for the LTE protocol. Both of these RANs may be operated by a common wireless service provider or by different wireless service providers.

The LTE RAN 10 in the example system is shown including a representative LTE base station 14 known as an eNodeB (or "eNB"), which includes an antenna structure and associated equipment for providing LTE coverage in which to serve UEs. The eNodeB 14 then has a communication interface with an example MME 16, where the MME functions as a signaling controller for the LTE RAN 10. Further, eNodeB 14 has a communication interface with a gateway system 18, which includes a serving gateway (SGW) 20 and a packet-data-network gateway (PGW) 22, the PGW provides connectivity with a packet-switched transport network 24 such as the Internet, and the MME has a communication interface with the SGW 20 as well. As further shown, a UE 29 is within the coverage of eNodeB 14. The UE 29 may be any type of device capable of wireless communications via the LTE RAN 10 and CDMA RAN 12, such as a mobile phone, tablet computer, laptop computer, car computer system, etc.

When a UE 29 enters into coverage of an LTE base station, such as eNodeB 14, the UE 29 may signal to the LTE base station to initiate an attachment process, and to establish for the UE a radio-link-layer connection (e.g., radio resource control (RRC) connection) with the LTE base station. The eNodeB 14 may then signal to the MME 16 so that the MME can authenticate UE 29 and obtain and store a context/profile record for UE 29. Further, the MME 16 engages in signaling with eNodeB 14 and the gateway system 18 to establish one or more bearers between UE 29 and the PGW 22. Further, PGW 22 assign to the UE an IP address for use on the packet-switched transport network 24.

In accordance with exemplary embodiments, the UE can also communicate via CDMA RAN 12. In FIG. 1A, the CDMA RAN 12 is shown including a representative CDMA base station 38 (also referred to as a base transceiver station (BTS)), which includes an antenna structure and associated equipment for providing CDMA coverage in which UEs can be served by the BTS and thus by the CDMA RAN. The BTS is then shown in communication with a base station controller (BSC) 40, which is in turn shown in communication with a mobile switching center (MSC) 42 that provides connectivity with the PSTN 44 and in communication with a packet data serving node (PDSN) 46 or gateway that provides connectivity with the packet-switched network 24. Other BTSs (not shown in FIG. 1A) may exist in this hybrid system as well, each providing CDMA coverage.

MSC 42 includes or has access to mobile station registration data 66. The mobile station registration data 66 preferably comprises data that specifies where UEs are currently registered, such as the zone in which each UE is currently registered, among possibly other information. More specifically, the mobile station registration data 66 may take the form of a visitor location register (VLR) database, which holds a record per UE in the MSC's service area. The UE's current zone of registration can thus be indicated in the UE's VLR record. Alternatively or additionally, the UE registration data can take the form of a home location register (HLR) database that is accessible via the MSC 42. Still alternatively, registration data may be stored internally at the MSC and/or base stations, or elsewhere in some other form.

In a further aspect, UE 29 is shown to be located within coverage areas of both the LTE RAN 12 and the CDMA RAN 10. In particular, UE 29 is located in an LTE coverage area of eNodeB 14 and in a CDMA coverage area of BTS 38. In the illustrated arrangement, UE 29 is a hybrid device) equipped to support both LTE service and CDMA service using the same radio system (e.g., an SRLTE device), and to selectively adjust the radio system to communicate with either LTE RAN 12 or the CDMA RAN 12.

Configured as an SRLTE UE, UE 29 may register with both the LTE RAN 10 (as described above, and with CDMA RAN 12. In order to register with CDMA RAN 12, UE 29 may detect a pilot signal broadcast by BTS 38 and responsively transmit a registration request message to the BTS, which the BTS may then forward (perhaps via the BSC 40) to the MSC 42. The MSC may then engage in signaling with a home location register (not shown) to register the UE as being served by the MSC, so that calls to the UE can be connected to the UE via the MSC.

As an SRLTE device, UE 29 only connects to one network at a time, and may be configured to prefer LTE service by default. Thus, once the UE 29 is registered with LTE RAN 10 and CDMA RAN 12, the UE 29 may remain connected (e.g., in an RRC_CONNECTED state) to the LTE RAN 10 by default, and tune away (e.g., disconnect) from the LTE RAN 10 only when necessary for CDMA communications. For example, UE 29 periodically tunes away from LTE RAN 10 to search for page messages from the CDMA RAN (for a UE-terminated call). UE 29 may also tune away from LTE RAN 10 to place a voice call to another device, and/or in other situations.

II CDMA Paging

As noted above, a CDMA network can use the same paging processes for an SRLTE device as it is for does for a device that communicates exclusively via the CDMA network (rather than connecting to the LTE network primarily, and only periodically tuning back to the CDMA network). Accordingly, the below description of CDMA paging applies to SRLTE devices, even if not stated explicitly.

Figure 1B:
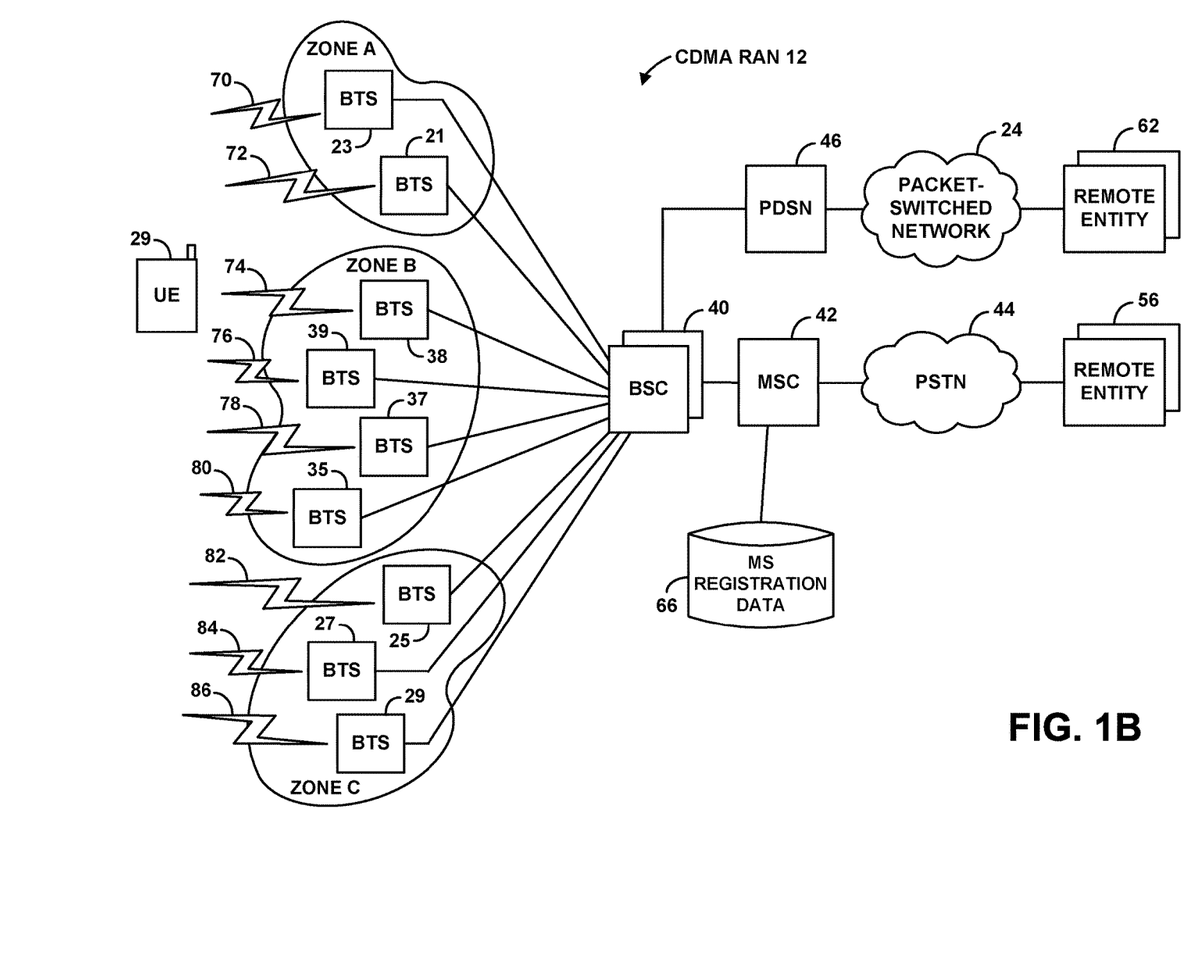
FIG. 1B illustrates additional aspects of the wireless communication system shown in FIG. 1A, according to exemplary embodiments.

For ease of explanation, aspects of CDMA paging are described with reference to FIG. 1B, which illustrates additional aspects of a CDMA RAN 12. While FIG. 1B does not explicitly show RAN 12 as part of a hybrid network, it should be understood that RAN 12 may be part of a larger network, such as that illustrated in FIG. 1A. Further, it is noted that in practice, the combination of a BTS and a BSC (e.g., BTS 38 and BSC 40), or one or more BTSs and a BSC, may be referred to as a "base station." The term "base station" may also refer to a BTS on its own (e.g., BTS 38).

In a further aspect, a CDMA RAN 12, and in particular, a CDMA base station working with an exemplary MSC 42, may be configured to page one or more UEs by generating and transmitting a page message over one or more paging channels. In an exemplary embodiment, an access network will typically receive an indication that a UE 29 should be paged (e.g., an incoming call) or may itself determine that a UE 29 should be paged. An incoming call notification typically provides the access network with an identifier of the UE, such as a unique mobile identification number (MIN), a unique mobile directory number (MDN), and/or a unique International Mobile Subscriber Identity (IMSI), among other possibilities. The base station may then use the MIN or IMSI as a basis to determine the carrier air interface (CAI) transmit address fields, and encode these fields into a page record, which may then be placed in a page message for transmission in the zone in which the UE is registered (and possibly other paging zones as well).

In an exemplary CDMA coverage area, the paging channel may be divided into time slots of a specific duration (e.g., 80 ms), and a specific number of consecutive time slots (e.g., 32 or 64) may then be grouped into cycles. Further, each UE 29 maybe assigned a specific time slot during each cycle (e.g., the $2^{nd}$ time slot in each 32-slot cycle) In certain implementations, a UE 29 determines which time slot to monitor based on a hash function of its International Mobile Station Identifier (IMSI). According to CDMS IS-95, a UE may operate in a dormant mode, and wake up to listen to its assigned time slot in each slot cycle, thereby helping to reduce power consumption by the UE.

However, in some scenarios, a UE 29 might only be paged a few times per hour, and so waking up every few seconds is unnecessary. To further reduce the UE's waking time, and thus its power consumption, CDMA2000 provides the QPCH, in which quick page messages are sent to UE 29. The purpose of the quick paging channel and the quick page message is to indicate to UE 29 whether or not the UE should wake up for the next paging channel slot. For example, if the CDMA RAN 12 knows that UE 29 is going to be paged during the next paging channel slot, then the CDMA RAN may indicate to UE 29 to wake up during the next time slot in order to receive the page message. Otherwise, UE 29 would stay asleep during the next time slot in order to conserve battery power.

The quick paging channel is divided into time slots, similar to that of the paging channel, and the CDMA RAN 12 assigns each UE 29 to a quick paging channel time slot that occurs a short time before that UE's time slot (e.g., 100 ms before). In this manner, UE 29 can receive the quick page message early enough to determine whether or not to wake up for the next paging channel time slot.

Figure 2:
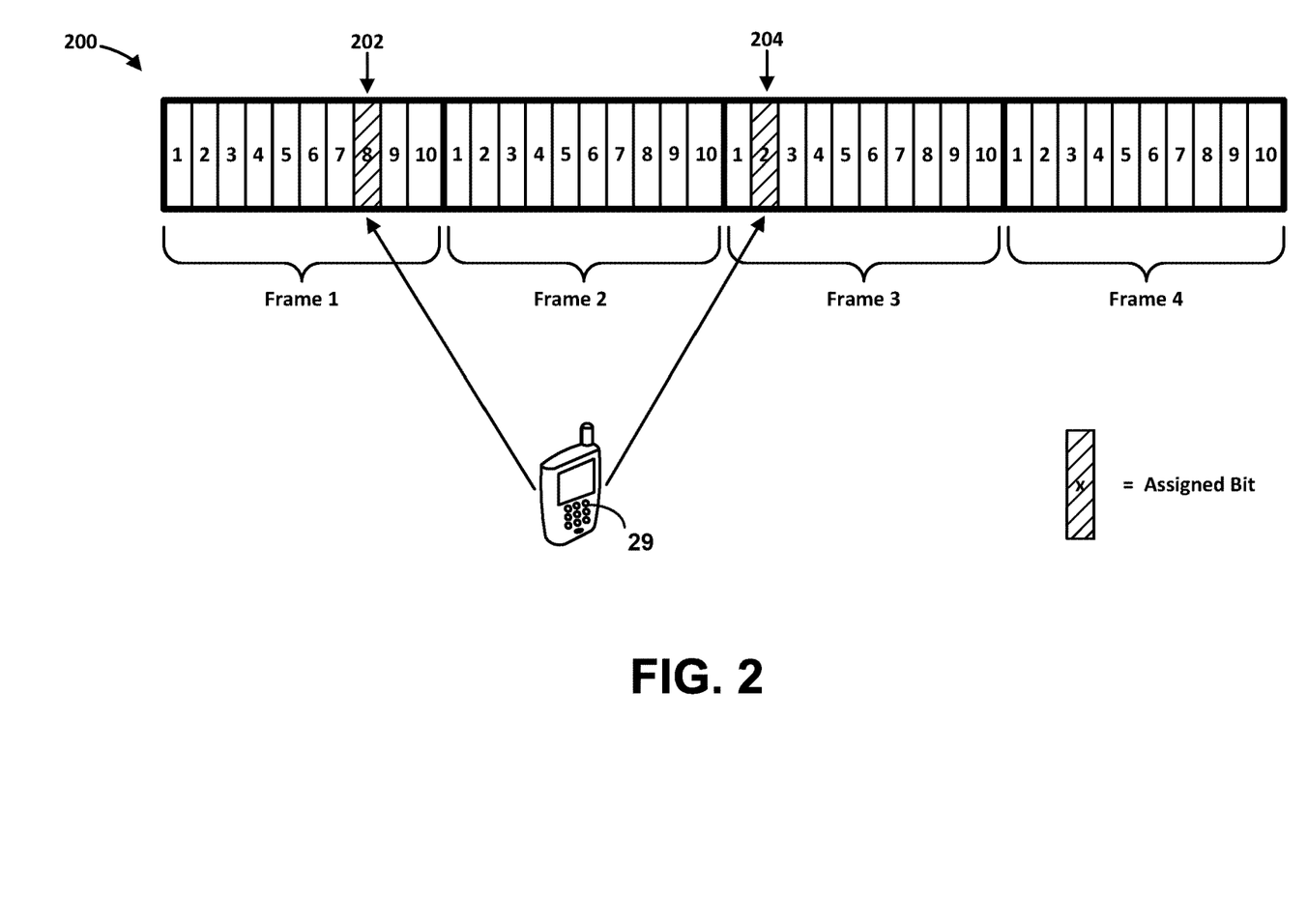
FIG. 2 illustrates a quick page message sent to during a quick paging channel time slot, according to exemplary embodiments.

FIG. 2 illustrates one implementation of a quick page message 200 sent to UE 29 during a quick paging channel time slot. The message 200 includes a plurality of bits (called paging indicator bits), divided into four frames. The CDMA RAN 12 assigns two of these bits, referred to as indicator bits, to each UE 29. The UE's first indicator bit 202 will appear in one of the first or second frames, while the UE's second indicator bit 204 will appear in one of the third or fourth frames. Note that in FIG. 2, the frames are shown as having 10 bits in each frame, however in practice, more or less bits may be used.

In a further aspect, the quick paging operation can use a hashing function to assign the UEs to two indicator bits in a quick page message. One example of a hashing function that may be used is a Bloom filter. Other examples are also possible.

In order to indicate to UE 29 that it should wake up to receive a page message on the UE's next assigned paging channel slot, the RAN will set both indicator bits 202, 204 in the quick page message 200 sent to UE 29. A set bit may take on the value of a "one" as opposed to a "zero", for example, when a page is scheduled for the UE. When UE 29 receives the quick page message 200, and determines that both of its assigned indicator bits 202, 204 are set, UE 29 will wake up during its next assigned paging channel slot. Otherwise, if the UE 29 determines that one or both indicator bits are not set, then UE 29 will not be paged and so it can remain asleep during the next paging channel slot. Accordingly, in the event that UE 29 determines that it should wake up during the next paging channel time slot, UE 29 listens for a general page message on its next paging channel time slot.

In exemplary embodiments, a UE 29 may be configured to wake up (or stay woken up) for its next assigned paging slot, when it cannot decode one or both of the its indicator bits on the QPCH. This may be the case, even when one bit cannot be decoded, but the other bit is successfully decoded and is not set. As a result, decoding errors on the QPCH, can cause a UE to unnecessarily listen for a page on the CDMA paging channel, when none is actually scheduled. And, in the case of an SRLTE UE 29, this can result in the UE undesirably remaining disconnected from the LTE RAN 10 to listen for a CDMA page, when none is scheduled.

Referring back to FIG. 1B, in a further aspect of CDMA paging, a CDMA RAN 12 may be arranged to engage in a targeted paging process known as "zone-based paging." With zone-based paging, a cellular network is divided into paging zones, each with a respective zone ID, and paging is performed on a zone-basis. For example, as shown in FIG. 1B, the CDMA BTSs are grouped into zones A, B, and C to facilitate zone-based paging as described above. In particular, zone C includes BTS 25-29, zone A includes 31-33, and zone B includes 35-39.

Accordingly, when a CDMA RAN 12 seeks to page a UE 29 (e.g., for an incoming call or for some other reason), a switch, such as MSC 42, may send a page to numerous base stations in the switch's coverage area, such as BTSs 35-29, with the hope that when the base stations broadcast the page message, the UE will receive the page message in one of the associated sectors, and will respond.

To facilitate zone-based paging, each base station (e.g., each BTS 25-29, 31-33, 35-39) in the system may broadcast as one of its overhead parameters the zone ID for the zone in which the base station is located. Each BTS may broadcast a zone ID indicating its zone, and a mobile station such as mobile station 64 may monitor the zone IDs broadcast in the coverage areas where the mobile station is operating.

When a UE 29 detects a change in zone ID, the UE may then responsively register its presence in the new zone, so that the RAN 12 will then know to page the mobile station in that new zone. To register with the network, a UE may send a registration message via the access channel in its current sector, and a switch in the network would note the UE's registration and convey an indication of the registration to a home location register for later reference. With this process, the registration records thereby maintained by switches (e.g., MSC 42) and/or home location registers will indicate the paging zone in which each UE last registered. Further, in some embodiments, the UE can include an indication as to whether or not it is operating as an SRLTE device (e.g., a predetermined bit set to either 1 or 0) in the registration message.

When a switch (e.g., MSC 42) seeks to page a UE 29, the switch may then efficiently send the page message to just those base stations that are within the zone of the UE's last registration, as it is likely that the UE is in that zone. Further, MSC 42 may initially send the page message to the base stations in zones adjacent to the UE's zone of last registration, to cover the possibility that the UE has moved to a new zone but has not yet registered its presence in the new zone. Once the designated base stations transmit the page message, if the UE does not respond to the page, the switch may then broaden the scope of the page, by sending the page message to a wider range of paging zones and perhaps ultimately to all base stations in the switch's serving area.

Using the general paging strategy that is implemented in many wireless access networks, the network may make up to three attempts to page a UE 29. In particular, the network may first attempt to transmit a page record in the paging zone in which the UE is registered (i.e., the base stations in the paging zone in which the UE is registered transmit the page record). Then, if the first attempt is unsuccessful (i.e., the UE does not acknowledge the page record), the network makes a second attempt to page the UE by again transmitting the page record in the paging zone in which the UE is registered, and possibly in adjacent zones as well. If the second attempt also fails, then the network makes a third attempt to page the UE, which typically involves a system-wide transmission of the page record (i.e., in all paging zones), although it is possible that a third attempt may be of a different scope as well.

It should be understood exemplary embodiments are not limited to the zone-based paging processes described herein, and that other zone-based paging schemes are possible, without departing from the scope of the invention. Exemplary methods and systems could be implemented in the context of other paging processes where more than one attempt can be made to send a given page message to a UE, and possibly in systems where multiple paging attempts are not permitted.

When a paging scheme that involves re-sending pages is employed (e.g., zone-based paging as described above), the switch (e.g., MSC 42) from which a page is disseminated may track the "paging-attempt status" of a given page. The paging-attempt status for a given page may include or take the form of an "attempt count," which indicates how many attempts have been made to send a given page to a UE. For example, an MSC 42 may include or have access to database that tracks the paging-attempt status of pages initiated by the MSC. As such, when a page is successfully received at the intended mobile station, and a page response message is received by the base station from which the page was sent, this may be relayed to the MSC. MSC 42 then knows not to initiate additional attempts to send the page and refrains from making additional attempts to send the page. On the other hand, if MSC 42 does not receive an indication that the page was successful from any BTS, MSC 42 will check the paging-attempt status, and if appropriate, send the page to base stations according to the zone-based paging scheme.

In a further aspect, a switch such as MSC 42 may be configured to provide the paging attempt status of a given page to the base stations that it sends a page to (e.g., to BTSs 35-39 via BSC 40). For example, an MSC may include in or associate an indication of the attempt count with a page, when it sends a page to a base station. An MSC may provide the paging attempt status of a page to a base station using other techniques as well.

III. Exemplary Network Components

Figure 3:
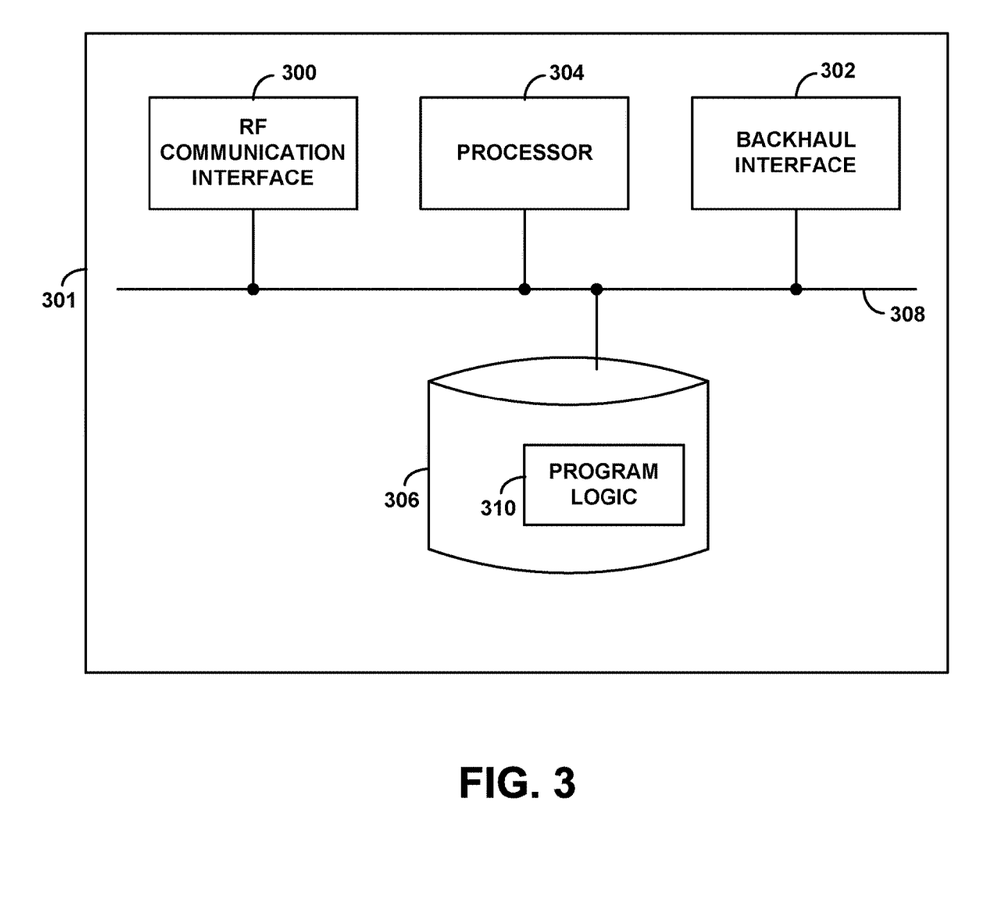
FIG. 3 is a simplified block diagram exemplifying a network component, according to an exemplary embodiments.

FIG. 3 is a simplified block diagram exemplifying a RAN component, according to an exemplary embodiment. In particular, FIG. 3 illustrates functional components that might be found in a RAN component 301 that is arranged to operate in accordance with the embodiments herein. As shown, the RAN component 301 may include a communication interface 300, a backhaul interface 302, a processor 304, and data storage 306, all of which may be communicatively linked together by a system bus, network, or one or more other connection mechanisms 308.

In practice, RAN component 301 may take the form of a base station (e.g., a BTS, BSC, or combination thereof), or may take the form of another component of a CDMA network and/or an LTE network. Further, the illustrated components of RAN component 301 (e.g., communication interface 300, a backhaul interface 302, a processor 304, and/or data storage 306) may be distributed and/or subdivided between one or more entities in an LTE network and/or in a CDMA network. It should be understood that an exemplary system may also take the form of another network entity or combinations of other network entities, without departing from the scope of the invention.

In RAN component 301, communication interface 300 may comprise one or more or wired or wireless communication interfaces and/or other associated equipment for engaging in communications with other network entities and/or for engaging in RF communications with UEs according to one or more air interface protocols. Backhaul interface 302 may comprise any sort of communication link or mechanism enabling the RAN component 301 to exchange signaling and bearer data with other network entities. Further, processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

IV. Exemplary Methods

Figure 4:
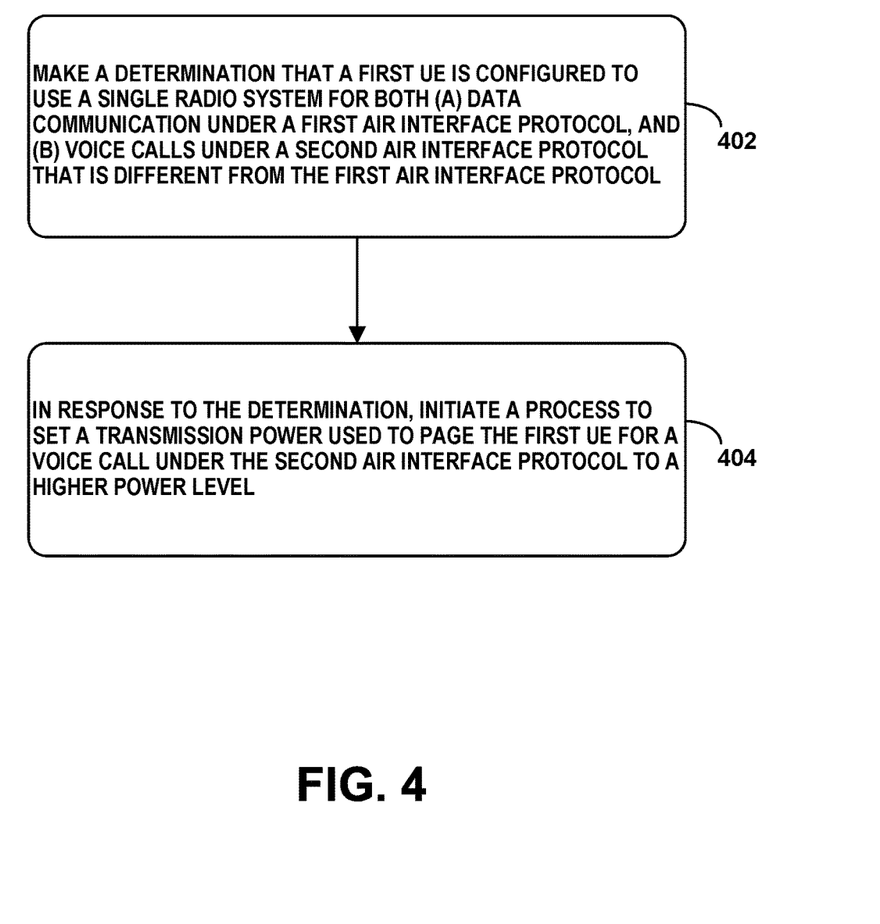
FIG. 4 is flow chart illustrating an exemplary method.

FIG. 4 is flow chart illustrating a method 400, according to an exemplary embodiment. Method 400 may be implemented by a network entity or entities from a radio access network, such as a base station (e.g., BTS and/or BSC), and/or a switch (e.g., an MSC), among other possibilities. For explanatory purposes, method 400 is described herein as being carried out by a base station in a CDMA network, which is part of a hybrid system also including an LTE network. It should be understood that method 400 or portions thereof may be implemented by other entities or combinations of entities, and/or may be implemented for other purposes, without departing from the scope of the invention.

As shown, block 402 of method 400 involves a base station making a determination that a first UE is configured to use a single radio system for both (a) data communication under a first air interface protocol, and (b) voice calls under a second air interface protocol that is different from the first air interface protocol. In an exemplary embodiment, the first air interface protocol is an LTE protocol, while the second air interface protocol is a CDMA protocol that defines a QPCH and specifies a quick paging process. As such, block 402 may involve determining that the UE is operating as an SRLTE device.

In response to making the determination at block 402, the base station initiates a process to set a transmission power used to page the first UE for a voice call under the second air interface protocol to a higher power level, as shown by block 404. In an exemplary embodiment, this higher power level is higher than a transmission power level utilized to page other UEs that use separate radio systems for data communication under the first air interface protocol and voice calls under the second air interface protocol. For instance, in an exemplary embodiment, block 402 may involve the UE increasing the transmission power on the UE's assigned slots on the QPCH, in an effort to increase the probability that the UE can successfully decode its indicator bits on the QPCH.

A. Determining that a UE is a Single-Radio Device

At block 402, various techniques may be utilized by the network entity to determine that a UE is configured to use a single radio for communications under different protocols for data and voice. For ease of explanation, method 400 is described below with reference to the implementation where block 402 involves determining that a UE is configured to operate as an SRLTE device (e.g., an SRLTE UE). However, it should be understood that block 402 could be applied with respect to any UE that is configured to use a single radio system for both (a) data communication under a first air interface protocol, and (b) voice calls under a second air interface protocol that is different from the first air interface protocol, and is not limited to SRLTE devices.

In some embodiments, a CDMA base station could maintain and/or have access to data records indicating whether or not a UE in the coverage areas it serves are configured to operate as an SRLTE device. To facilitate the creation and/or maintenance of such data records, a UE may be configured to notify the CDMA network that the UE is operating as an SRLTE device.

Accordingly, method 300 could further involve a network entity (e.g., a BTS) initially receiving a message from the UE indicating the UE is configured to use a single radio system for both data communication under the first air interface protocol and voice calls under the second air interface protocol. For instance, when an SRLTE UE registers with or sends an origination message to the CDMA RAN, the UE may include an indication that it is operating as an SRLTE device. In a CDMA RAN where zone-based paging is utilized, the UE may indicate it is operating as an SRLTE device when it registers in a new zone (e.g., in a zone registration message). Of course, a UE may additionally or alternatively include such information in other types of messages sent to the CDMA RAN.

When a base station (e.g., a BTS) receives such a message from a UE, the base station may update its data records for the particular UE, to reflect the fact the UE is an SRLTE device. In such embodiments, the base station may maintain and update local data records indicating whether or not UEs in its coverage area(s), or may have access to such data records stored elsewhere.

Additionally or alternatively, when a UE indicates it is operating as an SRLTE device (e.g., via a registration or origination message), the BTS may relay this information to the MSC. As such, method 300 could further involve the network entity (e.g., the MSC) initially receiving, via another network entity (e.g., a BTS), a message indicating that the first UE is configured to use a single radio system for both data communication under the first air interface protocol and voice calls under the second air interface protocol. The MSC can then update data records for the particular UE, to reflect the fact the UE is an SRLTE device. As an example, the MSC could update its entry in a paging table used for zone-based paging to indicate that the UE is an SRLTE device. In some embodiments, this could involve updating an entry for the UE in an HLR and/or VLR.

In any of the above scenarios, the network entity may access the data records for a given UE when a page is received for the given UE, in order to determine whether or not the given UE is operating as an SRLTE device. Accordingly, method 400 could further involve the network entity (e.g., a BTS or MSC) receiving a page for a voice call directed to the first UE, and performing method 400 in response to receipt of the page directed to the first UE.

B. Setting Page Transmission Power for an SRLTE Device

As noted above, block 404 may involve a CDMA base station initiating a process to set a transmission power used to page the first UE for a voice call under the second air interface protocol (e.g., CDMA) to a higher power level.

In an exemplary embodiment, the process initiated at block 404 can set the transmission power for some or all QPCH bits transmitted to the first UE. For instance, when method 400 is implemented by a base station (e.g., a CDMA BTS), block 404 may involve the base station updating an entry in its local data records (and/or in a database at another network entity communicatively coupled to the base station) to reflect that the UE is an SRLTE device. Accordingly, the process initiated at block 404 may further involve the base station checking such data records to determine whether or not a given UE is configured as an SRLTE device, whenever the base station receives a page message for transmission to the given UE, and adjusting the transmission power utilized to page the given UE accordingly.

Additionally or alternatively, block 404 could involve the base station sending a message to a CDMA switch (e.g., a CDMA MSC) indicating that the first UE is configured as a Single Radio LTE (SRLTE) device. This message may in turn cause the switch update the CDMA paging table to indicate that the first UE is an SRLTE device in a paging table entry for the UE (e.g., in a VLR and/or HLR entry for the first UE). In such embodiments, when the MSC subsequently receives a page directed to the first UE, the MSC may access the paging table to determine that the first UE is configured as an SRLTE device, and an include an indication of this configuration when it relays the page to the base station for transmission to the first UE. (In the case of zone based paging or any other scenario where multiple base stations can send the same page message, the MSC may indicate the fact that the first UE is configured as an SRLTE device to all base stations to which it sends a given page message.) To do so, the MSC may include metadata in the page message relayed to the base station, which indicates that the first UE is configured as an SRLTE device (e.g., by setting a bit in metadata to "1", which would otherwise be set to "0" for a non-SRLTE UE). Alternatively, the MSC could send a separate message to the base station in conjunction with sending the page message to the first UE.

In a further aspect, the process initiated at block 404 could also involve the base station sending a page message to the first UE at an increased power specified for SRLTE devices. For instance, consider the scenario where a base station may set a default transmission power (e.g., for non-SRLTE devices) in a coverage area to 3 dB below the transmission power used to transmit the pilot signal in the coverage area. In this scenario, the base station may increase the transmission power of the quick page bits sent to an SRLTE device to 1 dB below the pilot signal transmission power. Of course, it should be understand that this is but one of many possible ways in which a base station could use a higher QPCH transmission power an SRLTE UE, as compared to the QPCH transmission power used for non-SRLTE UE.

C. Adjusting Paging Transmission Power Based on SRLTE Configuration and Page Attempt Count In some scenarios, increasing transmission power on the QPCH can result in interference with transmissions in neighboring coverage areas. Accordingly, in some embodiments, the CDMA network may increase the transmission power for the QPCH before some, but not all, attempts to send a given page to an SRLTE device. For example, when it is determined that a given UE is an SRLTE device, the base station may increase the transmission power for the quick paging bits sent to the given UE before the first attempt to send the page message, but use a lower transmission power the quick paging bits sent prior to subsequent attempts to send the same page message. Other examples are also possible.

Figure 5:
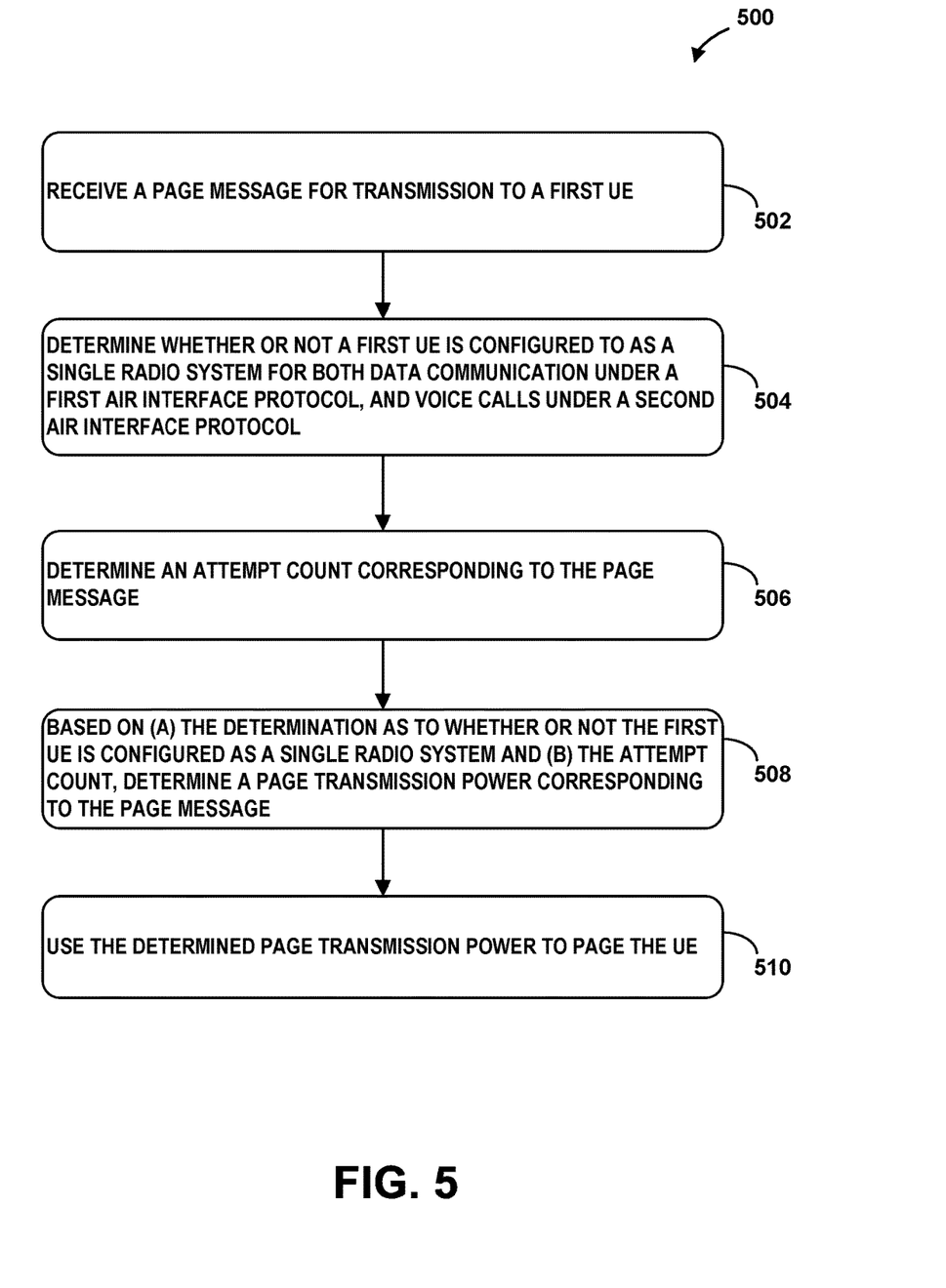
FIG. 5 is another flow chart illustrating another exemplary method.

FIG. 5 is a flow chart illustrating another method 500, according to an exemplary embodiment. Method 500 may be implemented by a network entity or entities from a radio access network, such as a base station (e.g., BTS and/or BSC), and/or a switch (e.g., an MSC), among other possibilities. For explanatory purposes, method 500 is described herein as being carried out by a CDMA network entity, which is part of a hybrid system including a CDMA network and an LTE network, where the CDMA network is configured to make up to a predetermined number of attempts to successfully page the first UE for a given voice call. It should be understood that method 500 or portions thereof may be implemented by other entities or combinations of entities, and/or may be implemented for other purposes, without departing from the scope of the invention.

Method 500 can be implemented in order to determine paging transmission power corresponding to a given page, based on a combination of a UE's configuration (e.g., as an SRLTE or non-SRLTE device) and the attempt count for the given page.

More specifically, method 500 involves a network entity receiving a page message for transmission to a first UE, as shown by block 502. For instance, block 502 could involve a base station (e.g., BTS and/or BSC) receiving a page message from a switch (e.g., an MSC). Alternatively, when method 500 or portions thereof are implemented by an MSC, block 502 could involve the MSC receiving the page message for transmission to the first UE.

At block 504, the network entity makes a determination as to whether or not a first UE is configured to as a single radio system for both data communication under a first air interface protocol, and voice calls under a second air interface protocol that is different from the first air interface protocol. In an exemplary embodiment, this determination may involve determining whether or not the first UE is configured to operate as an SRLTE device. In an embodiment where method 500 is performed by an MSC, block 504 could involve the MSC accessing a paging table (e.g., a VLR or other such database) to determine whether or not the first UE is configured as an SRLTE device.

Further, at block 506, the network entity determines an attempt count corresponding to the page message. The attempt count may indicate the number of attempts that will have been made once the next paging attempt is made, or the number of attempts that have already been made. For instance, in the former implementation, when a second attempt is about to be made to send a given page message to a given UE, the attempt count for the given page message will be equal to two (reflecting the fact that the page about to be sent is the second attempt). In the latter implementation, when a second attempt is about to be made to send a given page message to a given UE, the attempt count for the given page message will be equal to one (reflecting the fact that one attempt has already been made). In any such case, when a CDMA MSC or base station receives the page message directed to the first UE, the MSC or base station may determine the paging-attempt status (e.g., the attempt count) of the page message as described elsewhere herein. Of course, other techniques for determining the attempt count corresponding to a given page message are also possible.

Further, in the case of zone-based paging or any other scenario where multiple base stations can send the same page message, the MSC may indicate the attempt count corresponding to a page message, and/or may indicate whether or not the first UE is configured as an SRLTE device, to all base stations to which it sends a given page message (e.g., all base stations serving at least one coverage area in the paging where the page message will be sent). Additionally or alternatively, when a base station performs method 500, the base station (e.g., a BTS and/or BSC) could track or have access to a database providing the attempt count for page messages to UEs in coverage area(s) served by the base station. In this case, the MSC may not indicate the attempt count to the base station.

Continuing now to block 508, based on (a) the determination as to whether or not the first UE is configured as a single radio system and (b) the attempt count, the network entity determines a page transmission power corresponding to the page message to first UE. In an exemplary embodiment, the page transmission power determined at block 506 is the transmission power for a quick paging message to notify the first UE that the page message is about to be sent (e.g., the quick paging bits assigned to the first UE). Additionally or alternatively, block 508 could involve determining a paging transmission power for the transmission of the page message itself to the first UE (e.g., the transmission power for the first UE's assigned slot in the next slot cycle).

In some embodiments, block 508 may only take the attempt count into consideration (or may vary the way that the attempt count is taken into consideration) for SRLTE devices. For example, at block 508, when it is determined that the first UE is configured to operate as an SRLTE device, the network entity could then use the attempt count (as determined at block 506) as a basis for determining the paging transmission power.

As a specific example, block 508 may be implemented so as to only increase the paging transmission power corresponding to first attempt to send a given page message to an SRLTE UE. In particular, when the network entity determines that the first UE is configured as an SRLTE device, and that the attempt count is equal to one (in the event the attempt count indicates the number of attempts that will have been made after the forthcoming attempt) or zero (in the event the attempt count indicates how many attempts have already been made), then the network entity sets the paging transmission power to a first power level, which is higher than the transmission power setting specified for subsequent attempts and pages to non-SRLTE devices. Thus, when the first UE is not configured as an SRLTE device and/or the attempt count is greater than one (or zero, depending on the particular implementation), block 508 could involve setting the paging transmission power corresponding to the page message to a second (lower) power level.

Proceeding to block 510, the first UE may then be paged using the determined page transmission power. In an exemplary embodiment, block 510 can include transmitting a quick paging message to notify the first UE that the page message is about to be sent (e.g., transmitting the quick paging bits assigned to the first UE at the determined power level). Additionally or alternatively, block 508 could involve transmitting the page message itself (e.g., a page record) to the first UE at the determined page transmission power.

V. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   making a determination, by a network entity in a radio access network, that a first user equipment (UE) is configured to use a single radio system for both (a) data communication under a first air interface protocol, and (b) voice calls under a second air interface protocol that is different from the first air interface protocol; and
   in response to making the determination, initiating a process to set a transmission power used to page the first UE for a voice call under the second air interface protocol to a higher power level, as compared to a transmission power level utilized to page a second UE configured to use separate radio systems for data communication under the first air interface protocol and voice calls under the second air interface protocol,
   wherein initiating the process comprises sending a message indicating that the first UE is configured as a Single Radio Long-Term Evolution (SRLTE) device, so as to cause an update to a paging table entry for the first UE to indicate that the first UE is configured as an SRLTE device.

2. The method of claim 1, wherein first air interface protocol is a Long Term Evolution (LTE) protocol, and wherein the second air interface protocol is code division multiple access (CDMA) protocol.

3. The method of claim 1, wherein making the determination that the first UE is configured to use a single radio system for both (a) data communication under the first air interface protocol, and (b) voice calls under the second air interface protocol comprises:
   determining that the first UE is configured to operate as an SRLTE device.

4. The method of claim 3, wherein, to operate as an SRLTE device, the first UE is configured to:
   periodically switch from a connected state to a disconnected state under the first air interface protocol; and
   when disconnected under the first air interface protocol, monitor a paging channel defined under the second air interface protocol for a page message indicating an incoming voice call for the first UE.

5. The method of claim 4, wherein the paging channel defined under the second air interface protocol is a quick paging channel (QPCH) defined under a code division multiple access protocol.

6. The method of claim 1, wherein making the determination that the first UE is configured to use a single radio system for both data communication under the first air interface protocol and voice calls under the second air interface protocol comprises:
   initially receiving, from another network entity, a message indicating that the UE is configured to use a single radio system for both data communication under the first air interface protocol and voice calls under the second air interface protocol.

7. The method of claim 1, wherein making the determination that the first UE is configured to use a single radio system for both data communication under the first air interface protocol and voice calls under the second air interface protocol comprises:
   initially receiving, by the network entity, a message from the UE indicating the UE is configured to use a single radio system for both data communication under the first air interface protocol and voice calls under the second air interface protocol.

8. The method of claim 7, wherein the received message comprises a registration message that registers the UE with the radio access network under the second air interface protocol.

9. The method of claim 7, wherein the received message comprises a registration message that registers the UE in a particular paging zone from a plurality of paging zones.

10. The method of claim 1, wherein the network entity comprises a base station, and wherein initiating the process to set the transmission power used to page the first UE for a voice call under the second air interface protocol to the higher power level comprises:
    the base station sending, to a switch, the message indicating that the first UE is configured as an SRLTE device, such that the switch updates a paging table entry for the first UE to indicate the first UE is configured as an SRLTE device.

11. The method of claim 1, wherein pages to the first UE under the second air interface protocol are sent via a quick paging channel (QPCH), wherein a paging table initially indicates a default transmission power for the first UE on the QPCH, and wherein initiating the process to set the transmission power used to page the first UE for a voice call under the second air interface protocol to a higher value comprises initiating a process to update the paging table to indicate a higher transmission power for the first UE on the QPCH.

12. The method of claim 11, wherein the default transmission power is three decibels (dB) below a transmission power for a pilot channel, and wherein the higher transmission power is one dB below the transmission power for the pilot channel.

13. A system comprising:
a communication interface operable for communications under a first air interface protocol;
a non-transitory computer readable medium; and
program instructions stored on the non-transitory computer readable medium and executable by at least one processor to:
(i) make a determination that a first user equipment (UE) is configured to use a single radio system for both (a) data communication under a first air interface protocol, and (b) voice calls under a second air interface protocol that is different from the first air interface protocol; and
(ii) in response to making the determination, initiate a process to set a transmission power used to page the first UE for a voice call under the second air interface protocol to a higher power level, as compared to a transmission power level utilized to page a second UE configured to use separate radio systems for data communication under the first air interface protocol and voice calls under the second air interface protocol
wherein initiation of the process comprises sending a message indicating that the first UE is configured as a Single Radio Long-Term Evolution (SRLTE) device, so as to cause an update to a paging table entry for the first UE to indicate that the first UE is configured as an SRLTE device.

14. The system of claim 13, wherein the system is implemented in or takes the form of a base station in a radio access network.

15. The system of claim 13, wherein the process to set the transmission power used to page the first UE for a voice call under the second air interface protocol comprises a process that increases the transmission power for a quick page message sent via a quick paging channel.

16. A method comprising:
receiving, by a network entity in a radio access network, a page message for transmission to a first user equipment (UE), wherein the radio access network is configured to make up to a predetermined number of attempts to successfully page the first UE for a voice call under the second air interface protocol;
making a determination, by the network entity, as to whether or not a first UE is configured to as a single radio system for both data communication under a first air interface protocol, and voice calls under a second air interface protocol that is different from the first air interface protocol, wherein making the determination comprises determining whether the first UE is a Single Radio Long-Term Evolution (SRLTE) device based on a paging table entry for the first UE;
determining an attempt count corresponding to the page message; and
based on (a) the determination as to whether or not the first UE is configured as a single radio system and (b) the attempt count, determining a paging transmission power corresponding to the page message to first UE.

17. The method of claim 16, wherein making the determination as to whether or not the first UE is configured to use a single radio system for both (a) data communication under the first air interface protocol, and (b) voice calls under the second air interface protocol comprises:
determining whether or not the first UE is configured to operate as a Single Radio LTE (SRLTE) device.

18. The method of claim 17, wherein determining the paging transmission power corresponding to the page message comprises:
if the first UE is configured as an SRLTE device, the using the attempt count as a basis for determining the paging transmission power; and
otherwise, setting the paging transmission power corresponding to the page message to a transmission power associated with non-SRLTE devices.

19. The method of claim 17, wherein determining the paging transmission power corresponding to the page message comprises:
when the first UE is configured as an SRLTE device, and the attempt count is equal to one, then setting the paging transmission power to a first power level; and
otherwise, when the first UE is not configured as an SRLTE device, the attempt count is greater than one, or both, setting the paging transmission power corresponding to the page message to a second power level, wherein the second power level is less than the first power level.

20. The method of claim 16, wherein the paging transmission power corresponding to the page message comprises a transmission power for a quick paging message to notify the first UE that the page message is forthcoming.

* * * * *